July 25, 1933.  P. JONES  1,919,332

BORE HOLE SURVEYING DEVICE

Filed July 16, 1930  2 Sheets-Sheet 1

PHILIP JONES
INVENTOR

Paul W. Pritzman
ATTORNEY

July 25, 1933. P. JONES 1,919,332
BORE HOLE SURVEYING DEVICE
Filed July 16, 1930 2 Sheets-Sheet 2

PHILIP JONES
INVENTOR
ATTORNEY

Patented July 25, 1933

1,919,332

UNITED STATES PATENT OFFICE

PHILIP JONES, OF LOS ANGELES, CALIFORNIA, ASSIGNOR, BY DIRECT AND MESNE ASSIGNMENTS, TO JONES OIL WELL SURVEYING SERVICE, LTD., A CORPORATION OF CALIFORNIA

BORE-HOLE SURVEYING DEVICE

Application filed July 16, 1930. Serial No. 468,299.

These old devices are usually very complicated, subject to large errors and do not give direct records of azimuth and inclination, these being later laboriously computed by the resolution of the components thereof.

In the full development of the method herein described, azimuth and inclination are determined respectively by the position and length of a line upon a chart, these being recorded by a mechanism that is very much simpler than those of the old methods.

The principle of operation of this method may best be understood by reference to the attached drawings and the following description thereof, in which.

Figure 1:
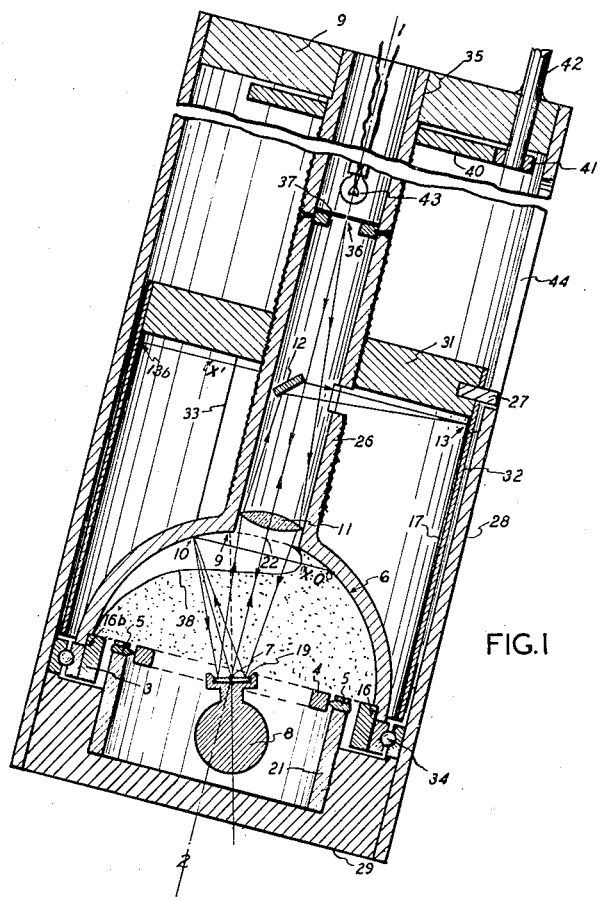
Fig. 1 is a cross-section and internal elevation an operable instrument in which the optical system is axially arranged.

A tube 28 supports at its lower end a block 29, which supports an inner tube 21 coaxially with outer tube 28. The inner tube 21 supports at its upper end the pivots 5—5 of a gimbal ring 4, which in turn supports a mirror 19 so that a point 7 in the mirror surface is held stationary on the axis 1—2 of the tube 28 and so that the mirror is free to swing about this point. The mirror 19 is so weighted by weight 8 that its surface is held always horizontal.

An assembly, consisting of a hemispherical shell 6 and a tube 26 integral with said shell, is supported by adapting ring 3 and ball bearing 34 and a guide bearing 35 so as to be coaxial with tube 28 and so as to rotate about the axis 1—2 and so that the center of the inner surface of the hemispherical shell 6, hereinafter called the hemisphere, is at point 7 in the surface of the horizontal mirror 19.

The tube 26 is exteriorly threaded and engages a nut 31 to which is attached the upper end of a tube 32. The tube 32 is adapted to receive a sheet of photo-sensitive paper or film 17 and to hold same in a substantially cylindrical form during the operation of the device. The paper or film is cut so that the edges thereof are abutted, as at 33, to form a substantially unbroken cylindrical surface, the photo-sensitive surface being inside such cylinder.

A pin 27 attached to the nut 31 engages a slot 44 cut in the outer tube 28 to prevent rotation of the tube 32 relatively thereto.

A lens 11 is coaxially mounted within tube 26 at the lower end thereof. A diaphragm 37, centrally perforated by a pin-hole 36 is mounted in the tube 26 so that the pin-hole 36 is concentric therewith. A lamp 43 is placed above the diaphragm 37 so that a portion of the filament thereof is on the axis 1—2. This arrangement of pin-hole and filament or lamp is the functional equivalent of a "point" source of light at the pin-hole 36, and in the following description the pinhole, rather than the lamp, is considered as the source of light. The diaphragm 37 is placed at such distance from the lens 11 that an image of the light-source 36 is focussed, via reflection from the horizontal mirror 19, at a point 10 on the hemisphere 6.

A small mirror 12 is diagonally mounted in the tube 26 with its mirror surface toward the lens 11 and so that the upper edge of such surface coincides with a diameter of tube 26 and at such distance from lens 11 that rays from the point 10 are focussed on the record surface at some point 13 thereof.

During the operation of the instrument, this assembly of hemisphere 6 and associated parts is continuously revolved.

With the optical train as described, rays from light source 36, via one-half of the lens 11, form a brilliant image of the light-source 36 on the surface of the hemisphere 6 at point 10. If the surface of the hemisphere be a reflecting surface at the point 10, the image of the point thereof which is thereby illuminated will be focussed via the other half of lens 11 and via mirror 12 at the point 13, which is therefore an illuminated point, and as it moves over the record surface, will photographically trace thereon a record of its path.

If, however, the surface of hemisphere 6 be nonreflecting at the point 10, the tracing point 13 will not be so illuminated and the record surface will be unaffected thereby.

In the following description the path of the tracing point 13 over the record surface 17 will be referred to as the record line, whether such path be recorded or not.

The functional operation of the device described for the purposes thereof depends on the following optical laws:

The plane of reflection from a plane mirror is normal to the plane thereof and includes the incident ray.

The angle of reflection from a plane mirror is equal to the angle of incidence.

The image of a point on the axis of a lens also lies on said axis, however it may be reflected by plane mirrors.

From these facts it follows that the point 10, being the image of point 36 which is on the axis of lens 11, lies also on such axis as reflected by mirror 19; also that the point 10 lies in the vertical plane through the axis 1—2, hereinafter called the azimuth plane, because mirror 19 is a horizontal mirror; also that point 10 lies on a parallel of latitude of the hemisphere 6 of which the co-latitude is equal to twice the angle of inclination 9—7—22 of the axis 1—2, which angle is hereinafter referred to as the axial inclination.

Similarly, the position of point 13 is determined by the position of mirror 12, as it revolves, and this point is also on the optical axis as reflected by the mirror 12.

It follows, also, that the positions of the two points 10 and 13 are independent of each other.

Figure 2:
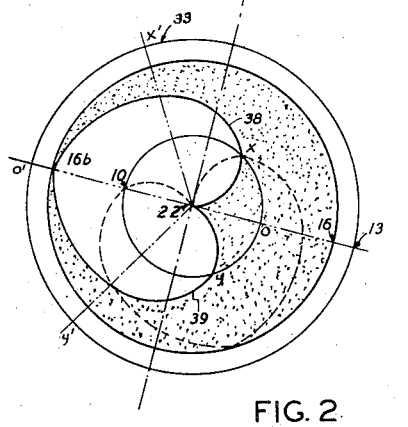
Fig. 2 is a view of the inner surface of the hemispherical shell 6 of Fig. 1.

Referring to Fig. 1 and the diagram Fig. 2 which is an axial view:

Upon one revolution of the hemisphere 6 and its associated mirror 12, the stationary point 10 describes a parallel of latitude on such hemisphere 6, which is shown as the line 10—O in Fig. 1 and as circle 10—X—O—Y in Fig. 2, the parallel so described being hereinafter referred to as the inclination circle. The tracing point 13 describes a circle 13—13$b$ in Fig. 1 and 13—X'—O'—Y' in Fig. 2 around the record surface 17, this circle being hereinafter referred to as the image circle. That is, the point 13, being determined solely by mirror 12, revolves with that mirror and with the hemisphere 6. Therefore a meridian quadrant 22—16 lies always in the revolving axial plane through the point 13. If O be a point on this meridian quadrant and on the inclination circle, point 13 will be at one intersection of the azimuth plane and the image circle when the point O coincides with point 10. This point of intersection is hereinafter designated as point O'. If X be any other point of the inclination circle, point 13 will be at a point X' of the image circle when point X coincides with point 10.

Because of the fact that the image and inclination circles are synchronously described, it follows that the distance O'—X' equals O—X, these distances being measured in degrees around the image and inclination circles, respectively.

The foregoing analysis of the relationship between points of the image circle and those of the hemisphere 6 has been without regard to whether the instrument is in functional operation or not.

These relationships are utilized by so marking the surface of the hemisphere 6 that points on the record line traced by point 13 may be identified and correlated to such markings on the hemisphere.

For example, if the surface of the hemisphere 6 be a reflecting surface throughout, the record line will be unbroken throughout its entire length. If, however, any nonreflecting line 38 be drawn on such reflecting surface and if the point X is the point of intersection of such line and the inclination circle, then at the position of coincidence of point X and point 10 no light will be reflected to point 13 and a minute break in the continuity of the record line will occur at point X'. That is, the image circle is a projection of the inclination circle as the inclination circle is scanned by point 10. The position of such break in the record line thereafter determines the position of the point O' of such record line if the longitude of the point X be known.

In general, however, unless the nonreflecting line 38 be a meridian, the longitude of the point thereof which may have caused the interruption at X' cannot be known from the record itself as such a break may have been caused by any point on the nonreflecting line. If, however, the latitude of the point X may be determined from the record, the longitude may be also determined, as the line 38 is an instrumental constant.

In order that such latitude may be so determinable two nonreflecting curves such as 38—39 may be drawn on the hemisphere; so that the longitudinal difference between them along any parallel of latitude is characteristic of such parallel. As the points X and Y, respectively, of such curves are successively coincident with point 10, they cause breaks in the record line at X' and Y'. The angular distances X'—Y' and X—Y being equal, this distance X'—Y' on the record line is characteristic of one parallel of latitude and therefore the breaks at X' and Y' constitute a complete record of instrument position. The distance X'—Y' is a measure of the angle of axial inclination in that it indicates which parallel of latitude of the hemisphere was coincident with the inclination circle. The latitude of the points X and Y being known, their longitude is also known, and from their respective image points X' and/or Y' the position of point O' may be determined.

Such a configuration of the hemisphere 6 is shown in Fig. 2. The two curves 38—39 are so drawn that they are symmetrical to each other with respect to the meridian 22—16 and so that the longitudinal difference between them along any parallel of latitude is equal to four times the colatitude of such parallel. These curves produce breaks in the record line between which the difference, in degrees, is eight times the axial inclination. The curves being symmetrical with respect to the meridian 22—16, the point O' of the record line is located midway between the two breaks. With such a figure, in order that there shall be no ambiguity between the records produced by large and small angles, that is that it may be determined in which direction the distance between the breaks shall be measured, it is advisable either to inscribe a single meridian quadrant 22—16 or 22—16b or to make the entire area between the curves non-reflecting, as is illustrated in Figs. 1 and 2.

Figure 4:
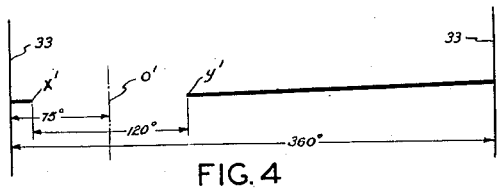
Fig. 4 is a diagram representing the development of a single record line as traced by the light point 13 on the interior of the sensitized paper cylinder 17 by bringing this paper into a plane.

In Fig. 4 is shown in reduced scale the record line as it would be produced by the instrument illustrated in Fig. 2 in the position shown.

The developed, finished record sheet shows a line which is broken for 120 degrees of its length, which is thus known to have been caused by the transit of a 120 degree segment of the figure on the hemisphere 6. This segment is characteristic of colatitude 30 degrees of such hemisphere, which is the inclination circle when instrument is inclined 15°. The mid-point of the break is the point O', as it is known that the blackened area is symmetrical with respect to the meridian 22—16.

The point O', so determined, is 75° from the edge of the record sheet. If the record cylinder were oriented, that is, if it be known, for example, that the abutting edges thereof were horizontally north of the axis thereof when the record was made, the record line is a complete determinant of instrument position and it can be stated at once that its inclination was 15° and that the direction of such inclination downward was N. 75° W.

It will be seen that the record line is slightly inclined across the record sheet. This results from the advance of the record sheet by the nut 31, as the tube 26 is rotated. The record lines, as produced by this uniform advance, are elements of a helix on the cylindrical record surface, but these lines appear as straight lines in the finished flat record sheet. As it is illustrated, this inclination is greatly exaggerated, as is the pitch at the screw in Fig. 2.

The form of the apparatus chosen for description is inoperative for such small angles of inclination that the inclination circles fall within the bore of the tube 26.

Figure 3:
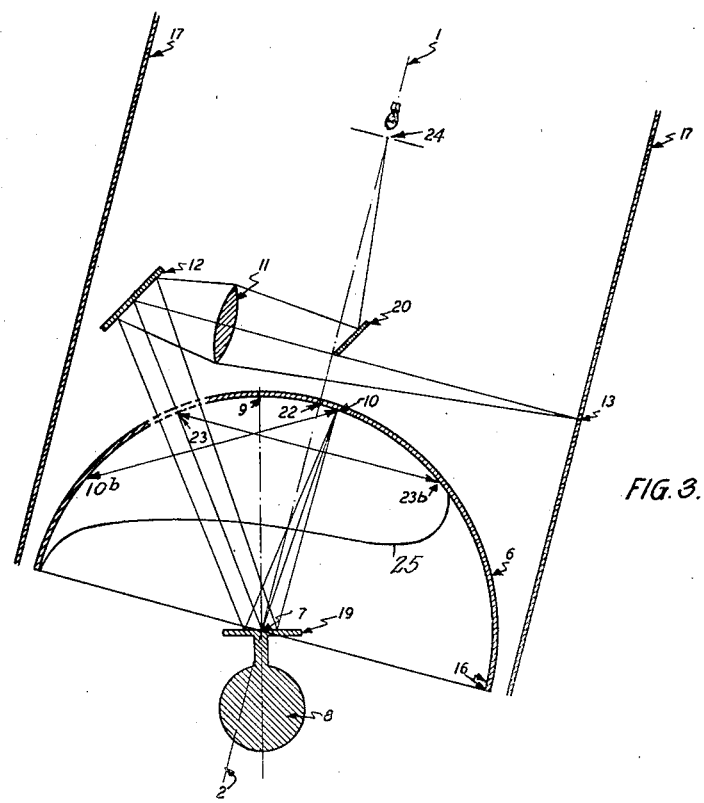
Fig. 3 represents diagrammatically an arrangement of parts generally similar to that shown in Fig. 1, but in which the optical system is nonaxial.

This defect is overcome by such an arrangement of the optical train as is shown in outline in Fig. 3. In such arrangement the optical axis is directed diagonally, that is, nonaxially, toward point 7 of the mirror 19. With this arrangement the path of point 10 over the surface of the hemisphere 6 for small axial inclination angles lies on an uninterrupted part of such surface.

With any such nonaxial arrangement, when the axis 1—2 is vertical, the point 10 will lie at a point 23b on the hemisphere surface 6 and upon rotation of the hemisphere, 6 will follow such point 23b as it travels around the circle 23—23b; that is, for zero axial inclination, the point 10 is stationary with respect to the hemisphere 6. For other angles of axial inclination the point 10 describes a circle 10—10b determined by the axial inclination, while point 23b describes the circle 23—23b. The resultant effect of these two motions is that the point 10 describes closed curves around the point 23b of the hemisphere 6, which curves are characteristic of the axial inclination and correspond to the inclination circles of the axial form previously described.

There is a similar, although not numerically identical, correspondence between the points of these curves and the position of their images when projected to that of the axial arrangement. The hemisphere 6 is figured with respect to these curves, as with respect to the inclination circles of the form described, to produce record lines of the same kind and for the same purpose, which record lines are interpreted in the same way.

It will be seen that the present invention does not of itself register the absolute azimuth of its axis 1—2, but it does determine the position of the azimuth plane through the record surface.

In order that such record be useful it is necessary that the record cylinder be oriented. By this it is meant that it is either known, or determinable, which point of the record line lay horizontally north of the axis 1—2 of the instrument at the time when such record line was traced.

This orientation may be accomplished by any one of several well-known means, as by lowering the instrument attached to a supporting pipe and either preventing the rotation of such pipe as the instrument is lowered or measuring such rotation, if any, as it occurs. Or two such instruments may be mounted at a measured distance apart on such a pipe support, the rotation during the lowering of the upper instrument to the position previously occupied by the lower one being shown in the difference in azimuth recorded by the two records, respectively. Or by auxiliary apparatus the position of either the magnetic or the true meridian may be recorded upon the record surface, or such surface maintained in orientation by such means.

These possible means of orientation are all well known and no claim is made herein concerning them.

During the operation of all forms of the device the hemisphere 6 and its associated optical parts are maintained in continuous revolution, the rate of such revolution being largely arbitrary but governed, in general by the photographic demands.

In the form illustrated in Fig. 1 this rotation is accomplished by the gear 40 driven by pinion 41 which, in turn, is driven by the shaft 42 of any convenient motor mechanism, as of a small electric motor not shown.

In the survey of bored wells the location of the instrument along the bore thereof is recorded with reference to time. The axial advance of the record sheet being at a substantially uniform rate, the correlation between instrument location and the position of the corresponding record lines are easily accomplished. It is seldom necessary in practice, however, to use this chronometric correlation because the finished records show very clearly the disturbances of the instrument as it is lowered from station to station in the well.

For clarity of description, as a method of recording varying light intensity at 13, this point has been described as rotating synchronously with hemisphere 6 and the record line traced upon relatively stationary surface 17. It is obvious that by any of several methods of arrangement, the point 13 may be kept stationary and a photosensitive surface moved with respect to it, at a rate functionally related to that of the rate of rotation of shell 6. This surface may be situated so that it moves directly across point 13 or by well known photoelectric devices the record may be made at a distant point.

The foregoing descriptions have been as of ideal apparatus; that is, for example, the form of Fig. 1 was described as being truly axial. It is an important characteristic of the device that within very wide limits such precise accuracy of construction is unnecessary. In the description of the nonaxial form shown in Fig. 3, it was shown that the hemisphere 6 can be figured so as to produce functional record lines with very large angles of misalignment between the optical axis and the instrument axis 1—2.

In the description of the axial form in Fig. 1 it was shown that any two curves, so drawn on the hemisphere 6 that their distance apart is characteristic of the parallels of latitude of such hemisphere, produce record lines that are fully determinative of instrument position.

These relationships result in the fact that, within very wide limits, errors of axial alignment or errors in the shapes of the figures on the hemisphere 6 are not important. Within such limits, whatever these errors may be, characteristic record lines will be produced which may be identified by calibration.

It will be noted, in all forms of the instrument, that its utility is possible only because a distinguishable point of the record line can be established as being the image of another point which, at the instant of its projection, was at a predetermined position with respect to the azimuth plane. Thus, in the axial form in Fig. 1, it is known that all points of the image circle are projected from a stationary point 10 in the azimuth plane at an angular distance from the axis 1—2 equal to twice the axial inclination. That is, the points of the image circle are projected from the various points of the hemisphere only if, as, and when they are in this predetermined position.

Of course, this absolutely stationary position of the point 10 is impossible to realize in practice because it is conditional upon perfection of construction.

In all practical instruments, therefore, the point 10 does not remain stationary in the azimuth plane but describes a circle which is determined by the axial inclination and physical constants of the instrument, which circle in all instruments corresponds to the circle 10—10b of Fig. 3. But in all cases the points of the image circle are projected from the various points of the hemisphere 6 only if, as, and when they coincide with point 10; or, in other words, when they are in a predetermined position with respect to the azimuth plane; or, in still other words, the points of the moving hemisphere 6 are projected and photographed at the instants of their several transits across preestablished positions with respect to the azimuth plane, as in the terminology of the attached claims.

In further reference to the attached claims it will be understood that by the word "azimuth" is meant the direction of the inclination of the axis of the instrument itself with respect to some line element of the cylindrical record surface 17, whether this line element be oriented or not. In the typical record line shown in Fig. 4 the "azimuth" as here defined is the angle 75° from the "line element" (the abutted edges of the paper 33) irrespectively of whether the orientation of this line element be known or not. By "absolute azimuth" is meant the direction of such inclination with respect to terrestrial directions.

Throughout the foregoing specification the various references to points and lines have been as of ideal apparatus and in practice it is desirable that this ideal be approached as nearly as possible.

However, in practice, the pin-hole 36 must be an actual hole; so that "point 10" and "point 13" are, in reality, small finite areas and the record line is a narrow band composed of the images of such small areas along the inclination circle. In the attached claims, however, the ideal terminology will be adhered to and the small areas which are, ideally, points will be referred to as points; and the narrow bands which are, ideally, lines will be referred to as lines; and the photographic scanning of the central points of such small areas as point by point photography.

It will be seen that the record lines, although composed of the successively projected image points of curves on the hemisphere 6, are not pictorial representations of these curves, as is most clearly exemplified in the case of the record produced by the nonaxial instruments (illustrated in Fig. 3) when the instrument is vertical, the record line in this case being the continuous projection of the same point, 23b of Fig. 3.

This sharply distinguishes the present invention from those devices in which a pictorial photograph of the positions of various indicating devices, such as pendulums, spirit levels, compass needles, or the like, is made for the purposes thereof. It is not intended therefore, that anything in the claims hereof shall be understood as referring to such pictorial devices.

In the present invention the record as made at any single instant is a point and by itself is valueless. The record line is necessarily made by a moving point and the marked surface is necessarily a moving surface in order that an intelligible record may be made at all.

This also differentiates the apparatus from all that class of instruments wherein photographs are made of apparatus which is at rest and relatively large areas are photographed at once, as is diametrically opposed to the point by point scanning along a line thereof, as is herein described, and nothing in the accompanying claims is intended to define any such class of instruments.

The record line produced by the present invention consists of a single substantially straight line across the record sheet, which line, in general, must have distinguishable interruptions in the continuity thereof. That is, such a line is, in itself, a complete index of inclination and azimuth, as hereinabove defined. This line may be invisible on the record for most of its length (as when very large inclination angles are recorded by such an instrument as is illustrated in Fig. 1) and it may be repeated many times if the instrument is stationary for long periods, but, nevertheless, each line of the record is complete in itself without reference to any other line or point on the record sheet except to identify the position of the interruptions therein as with respect to the edge 33 of the record sheet of Fig. 4.

This similarly differentiates the device, and the record, from that class of instruments wherein the position of a recorded line is varied according to instrument position, as by a mechanically-driven stylus or by moving a light beam over a photo-sensitive record surface in a path which varies according to instrument position. In the present invention it is particularly to be noted that the path of the tracing point 13, and therefore the position of the record line, is not dependent upon the position of the instrument. It also differentiates the record line from lines in photographs which are reference lines to which the position of other indices may be referred.

In the foregoing specification the revolving surface has been considered always as a hemisphere. It is not intended, however, to limit the invention to such a hemispherical surface.

This form is preferred because of the unvarying focal relationships obtained by its use, but these relationships are not critical and, in fact, for very small angles of inclination, other surfaces may even be preferred; for other optical systems, other figures may be adopted to advantage.

It is also to be understood that the terms "reflecting" and "nonreflecting" are relative, as are the terms "recorded" and "unrecorded" lines.

It is sufficient, for the purposes of the invention, that the variations in the character of the surface of the hemisphere 6 shall produce distinguishable variation in the character of the record line; that is, the markings of the hemisphere or functionally equivalent surface shall be photographically distinguishable.

The method of illumination is also largely arbitrary. In the method illustrated and preferred, the limitation of the tracing point 13 to "point" dimensions is accomplished by limiting the illuminated area of the hemisphere 6. With other methods of illumination this restriction of the size of the tracing point may be accomplished by a similarly perforated mask near the record surface, this arrangement being almost exactly analogous to a focal-plane shutter of a camera and the effect is the same as that illustrated and described, to-wit: the light admitted to the tracing point 13 is only that emanating from a single point of the hemisphere 6.

I claim as my invention:

1. A method for determining the absolute azimuth of a surveying instrument consisting of the point-by-point photography upon an oriented surface of photographically distinguishable points on a revolving surface as such points occupy preestablished positions with respect to the vertical plane through the axis of said instrument.

2. A method of determining the inclination of a surveying instrument consisting of the point-by-point photography of a series of points on a revolving surface, the series so photographed being determined by the inclination of the instrument and the several series capable of being so photographed being distinguishable from each other in the photograph produced.

3. A method for the determination of absolute azimuth and inclination of a surveying instrument consisting of the point-by-point photography on an oriented surface of a series of points on a revolving surface, the series of points so photographed being determined by the inclination of the instrument and being photographically distinguishable from other such series, said points being photographed at the instants of their several transits across preestablished positions with respect to azimuth plane.

4. A method for the determination of azimuth of a surveying device consisting of the projection of light rays from points on a moving surface to a photosensitive surface in such manner that the position of said rays on the photosensitive surface is governed by the position of said points with respect to the azimuth plane at instant of said projection.

5. A method of determining the position of the vertical plane through the axis of an oriented cylinder comprising: photographing upon said cylinder at a preestablished angular position with respect to such plane of a point on a moving surface as said point reaches a preestablished position with respect to said plane.

6. A method of determining the inclination of the axis of an oriented cylinder comprising: photographing upon said cylinder at a preestablished angular position with respect to the vertical plane through said axis of a point on a moving surface as said point reaches a preestablished position with respect to said plane.

7. A method of simultaneously recording the azimuth and inclination of an instrument which comprises: revolving within said instrument a figure of predetermined form and photographing points on the boundary of said figure when said points, during said revolution, reach a position as related to the azimuth which is determined by the angle of inclination of the instrument at the instant of transit of the axis of said figure.

8. A method of simultaneously recording the azimuth and inclination of an instrument which comprises: projecting a light beam against a reflecting surface adapted to maintain a constant horizontal position; reflecting said beam to a reflecting surface adapted to revolve with the instrument and bearing a nonreflecting figure; interrupting said beam by the transit therethrough of said figure, and directing said beam against a photosensitive surface moving relatively to said beam.

9. An automatic surveying apparatus, comprising: a moving surface; a photosensitive surface, and means for the recording upon said photosensitive surface of the position of established points upon said moving surface at the instants of their several transits across planes having determinable angular relations to the vertical plane through the axis of said apparatus.

10. Means for recording lines on a cylindrical surface in such manner that the positions of distinguishable parts of said lines shall be in definite relation to the position of the azimuth plane through said cylindrical surface.

11. Means for recording lines on a cylindrical surface in such manner that the positions of distinguishable parts of said lines shall be in definite relation to the position of the azimuth plane through said cylindrical surface and to the inclination of the axis thereof.

12. In an automatic surveying instrument: means for recording a line around a cylindrically disposed surface in such manner that the position of distinguishable parts of said line on said surface shall be in preestablished relation to the position of the vertical plane through the axis of said cylinder, and in such manner that the positions of distinguishable parts of said line with respect to each other shall be determined by the inclination of said axis.

13. In an automatic surveying instrument: means for varying the light intensity at one end of the effective axis of an optical train, the ends of said axis being in determinable position with respect to the azimuth plane, according to a preestablished variation in reflectivity of a moving surface at the other end of said axis.

14. An instrument for continuously recording its own azimuth, comprising: a photosensitive surface; means for continuously moving a light beam over said surface, and means for varying the intensity of said beam as said beam reaches a predetermined position with respect to the azimuth plane.

15. An instrument for recording its own azimuth, comprising: a photosensitive surface; means for moving a light beam over said surface, and means for varying the intensity of said beam as said beam reaches a predetermined position with respect to the azimuth plane.

16. An instrument for continuously recording its own azimuth, comprising: a cylindrical photosensitive surface; means for continuously moving a light beam in a helical path relatively to said surface, and means for varying the intensity of said beam as said beam reaches a predetermined position with respect to the azimuth plane.

17. An instrument for recording its own azimuth, comprising: a cylindrical photosensitive surface; means for continuously moving a light beam around said surface, and means for varying the intensity of said beam as said beam reaches a predetermined position with respect to the azimuth plane.

18. An instrument for simultaneously recording its own azimuth and inclination, comprising: a photosensitive surface; means for moving a light beam relatively to said surface, said means including a reflector, and a nonreflecting figure, said figure being adapted to so interrupt said beam that the position on said surface of breaks in the line traced by said beam indicate azimuth direction and that the extent of said breaks indicate degree of inclination.

19. An instrument for simultaneously and continuously recording its own azimuth and inclination comprising: a reflecting surface adapted to be maintained in revolution and having a nonreflecting figure associated therewith and another reflecting surface, one of said surfaces being rigidly affixed to said instrument and the other of said surfaces being adapted to maintain a constant position in space; means for projecting a light beam from one to the other of said surfaces whereby said beam is interrupted by the transit therethrough of said figure, and means for continuously moving said beam over a photosensitive surface whereby a line interrupted by the transit of said figure across said beam is traced on said sensitive surface.

20. A record of a deep well survey, comprising: a substantially continuous straight line traced on a photosensitive surface, said lines being broken to indicate inclination and the position of the break in each said line indicating azimuth.

PHILIP JONES.

CERTIFICATE OF CORRECTION.

Patent No. 1,919,332.

July 25, 1933.

PHILIP JONES.

It is hereby certified that error appears in the printed specification of the above numbered patent requiring correction as follows: Page 1, before line 1, insert the following paragraphs:

The invention herein described relates to that class of instruments whose purpose is the automatic determination of direction or azimuth and vertical angle, as the axis of bored wells and the like.

There are a number of more or less successful devices in present use all of which, so far as it is known, operate by mechanically or photographically recording the positions of a plurality of pendulums, adapted to swing in nonparallel planes, or by record of the components of the position of a single pendulum in similar planes.

And that the said Letters Patent should be read with this correction therein that the same may conform to the record of the case in the Patent Office.

Signed and sealed this 21st day of November, A. D. 1933.

F. M. Hopkins (Seal)

Acting Commissioner of Patents.